US011278996B2

(12) United States Patent
Freed et al.

(10) Patent No.: US 11,278,996 B2
(45) Date of Patent: Mar. 22, 2022

(54) ROTARY SEAL

(71) Applicant: Deublin Company, Waukegan, IL (US)

(72) Inventors: Lisa Freed, Cary, IL (US); Lauren Dahlke, Gurnee, IL (US)

(73) Assignee: Deublin Company, LLC, Waukegan, IL (US)

( * ) Notice: Subject to any disclaimer, the term of this patent is extended or adjusted under 35 U.S.C. 154(b) by 246 days.

(21) Appl. No.: 16/554,161

(22) Filed: Aug. 28, 2019

(65) Prior Publication Data

US 2020/0070293 A1 Mar. 5, 2020

Related U.S. Application Data

(60) Provisional application No. 62/725,766, filed on Aug. 31, 2018.

(51) Int. Cl.
| | | |
|---|---|---|
| *B23Q 11/10* | (2006.01) | |
| *B23Q 5/26* | (2006.01) | |
| *B23Q 5/06* | (2006.01) | |
| *B23Q 11/12* | (2006.01) | |
| *F16L 27/08* | (2006.01) | |
| *F16J 15/34* | (2006.01) | |
| *F16L 17/06* | (2006.01) | |

(52) U.S. Cl.
CPC ............ *B23Q 11/103* (2013.01); *B23Q 5/06* (2013.01); *B23Q 5/261* (2013.01); *B23Q 11/127* (2013.01); *F16L 27/0804* (2013.01); *F16J 15/3448* (2013.01); *F16J 15/3452* (2013.01); *F16L 17/06* (2013.01)

(58) Field of Classification Search
CPC . F16L 27/087; F16L 27/0828; F16L 27/0804; F16L 27/082; F16J 15/164; F16J 15/3224; F16J 15/52; F16J 15/46; B23Q 17/007; B23Q 11/103; B23Q 11/127
USPC ..................................... 285/272, 272.1, 275
See application file for complete search history.

(56) References Cited

U.S. PATENT DOCUMENTS 5,577,775 A * 11/1996 Pearson ................. F16L 27/082
5,617,879 A * 4/1997 Kubala ............... F16L 27/0828
5,669,636 A * 9/1997 Kubala ................. F16L 27/082
(Continued)

FOREIGN PATENT DOCUMENTS

| DE | 10-2011-001237 A1 | 9/2012 |
| JP | 2018-043332 A | 3/2018 |

OTHER PUBLICATIONS

"High-Speed Integrated Motor Spindle for Machining Centers," http://www.nsk.com.br/upload/file/e2204.pdl (2005).
(Continued)

*Primary Examiner* — Zachary T Dragicevich
(74) *Attorney, Agent, or Firm* — Leydig, Voit & Mayer, Ltd.

(57) ABSTRACT

A rotary union for use along an incompressible fluid path between a rotating machine component and a non-rotating machine component includes a non-rotating seal carrier including a non-rotating seal element, which together with the non-rotating seal carrier define a net hydraulic surface on an internal side and a net pneumatic surface on an external side. Contact of an incompressible fluid under pressure with the net hydraulic surface creates a closing force, and contact of a compressible fluid under pressure with the net pneumatic surface creates an opening force.

20 Claims, 3 Drawing Sheets

(56) References Cited

U.S. PATENT DOCUMENTS

| | | | |
|---|---|---|---|
| 5,707,186 | A | 1/1998 | Gobell et al. |
| 6,406,065 | B1 | 6/2002 | Ott et al. |
| 6,533,509 | B1 | 3/2003 | Antoun |
| 6,692,202 | B2 | 2/2004 | Katsuzawa et al. |
| 6,729,813 | B2 | 5/2004 | Sahm et al. |
| 8,453,675 | B2 | 6/2013 | Burrus et al. |
| 8,777,529 | B2 | 7/2014 | Rozzi et al. |
| 9,133,967 | B2 | 9/2015 | LaCroix |
| 9,381,606 | B2 | 7/2016 | Jaffe et al. |
| 2006/0273579 | A1* | 12/2006 | Ford .................... F16L 27/082 |
| 2007/0034265 | A1* | 2/2007 | Mohr .................. F16L 27/0828 |
| 2008/0016950 | A1* | 1/2008 | Kubala ................ B23Q 11/103 |
| 2014/0035274 | A1* | 2/2014 | LaCroix ............... F16L 27/082 |
| 2016/0018031 | A1 | 1/2016 | Petrou |
| 2016/0250730 | A1 | 9/2016 | Dotan et al. |

OTHER PUBLICATIONS

Deublin Engineering Catalog, MT063US (2006).
"Coolant-Through-Spindle System Retrofits of Fadal VMCs," www.mag-ias.com (Aug. 25, 2010).
Leventon, William, "Rotary Unions Help Deliver Coolant to the Cutting Zone," www.ctemaq.com. (Sep. 1, 2016).
"Design FAQs: Through-Spindle Coolants," https://www.deublin.com/assets/1/7/Deublin-_FAQ_(MD)_42116_V8.pdf (accessed Aug. 21, 2018).
International Patent Application No. PCT/US2019/049051, Search Report (dated Nov. 21, 2019).

* cited by examiner

ROTARY SEAL

CROSS-REFERENCE TO RELATED APPLICATIONS

The instant application claims priority to Provisional U.S. Patent Application Ser. No. 62/725,766 titled "Rotary Union" and filed on Aug. 31, 2018.

BACKGROUND OF THE DISCLOSURE

In machine tools, a spindle can be described as a device that includes a rotating axle or shaft that will typically carry a cutting or other tool. Depending on the type of machine, the spindle may be powered to rotate the axle or shaft by various types of motive power such as electrical motors, hydraulic or pneumatic motors and the like. In applications using pneumatic power to drive the shaft, the shaft may include turbine vanes connected to the shaft and enclosed within a housing of the spindle having a scrolled or other shape that forces air provided at a high pressure to pass over the vanes to cause the shaft to rotate. Under typical operating conditions, pressurized air is supplied, for example, 90 psi, and causes the shaft to rotate at a high speed, for example, 65,000 RPM. So called air turbine shafts are known in machines for forming components, such as CNC machines.

While air turbine shafts are useful in providing a high-speed shaft that can perform machining operations, their high speed of operation can generate heat between the shaft tool and the work piece, which is typically addressed by providing an external flow of coolant, which both cools the work piece and removes debris. However, the positioning of the coolant flow onto the area of the work piece is not always optimal, or even possible, especially when machining an area within a narrow cavity of the work piece.

BRIEF SUMMARY OF THE DISCLOSURE

In one aspect, the disclosure describes a rotary union disposed along an incompressible fluid path between a rotating machine component and a non-rotating machine component. The rotary union includes a mounting sleeve disposed in a bore formed in the non-rotating machine component. The mounting sleeve forms a sliding bore into which a non-rotating seal carrier is slidably and sealably disposed. The non-rotating seal carrier includes a non-rotating seal element, which together with the non-rotating seal carrier define a net hydraulic surface on an internal side and a net pneumatic surface on an external side. A rotating seal element is disposed on the rotating machine component. The non-rotating seal carrier is movable in an axial direction between an extended position, in which the rotating and non-rotating seal elements are in contact to form a mechanical face seal, and a retracted position, in which a gap is formed in the axial direction by separation of the rotating and non-rotating seal elements. During operation, contact of an incompressible fluid under pressure with the net hydraulic surface creates a closing force in a closing direction tending to push the non-rotating seal carrier from the retracted position towards the extended position. Further, during operation, contact of a compressible fluid under pressure with the net pneumatic surface creates an opening force in an opening direction tending to push the non-rotating seal carrier from the extended position towards the retracted position.

In another aspect, the present disclosure describes a method for operating a rotary union. The method includes providing a non-rotating seal carrier slidably and sealably disposed within a sliding bore, the non-rotating seal carrier including a non-rotating seal element; defining net hydraulic surface on an internal side of the non-rotating seal element and the non-rotating seal carrier; defining a net pneumatic surface on an external side of the non-rotating seal element and the non-rotating seal carrier; providing a rotating seal element disposed on the rotating machine component; and moving the non-rotating seal carrier in an axial direction between an extended position, in which the rotating and non-rotating seal elements are in contact to form a mechanical face seal, and a retracted position, in which the a gap is formed in the axial direction by separation of the rotating and non-rotating seal elements. In one embodiment, moving from the retracted to the extended positions is accomplished by providing a incompressible fluid in contact with the net hydraulic surface to create a closing force in a closing direction, and moving from the extended to the retracted positions is accomplished by providing a compressible fluid in contact with the net pneumatic surface to create an opening force in an opening direction.

In yet another aspect, the disclosure describes a rotary union disposed along an incompressible fluid path between a rotating machine component and a non-rotating machine component. The rotary union includes a mounting sleeve disposed in a bore formed in the non-rotating machine component, the mounting sleeve forming a sliding bore, a non-rotating seal carrier slidably and sealably disposed in the sliding bore, the non-rotating seal carrier including a non-rotating seal element, wherein the non-rotating seal element and the non-rotating seal carrier define a net hydraulic surface on an internal side and a net pneumatic surface on an external side, a rotating seal element disposed on the rotating machine component, and a spring disposed between the mounting sleeve and the non-rotating seal carrier, the spring providing a spring force onto the non-rotating seal carrier. The non-rotating seal carrier is movable in an axial direction during operation between an extended position, in which the rotating and non-rotating seal elements are in contact to form a mechanical face seal, and a retracted position, in which a gap is formed in the axial direction by separation of the rotating and non-rotating seal elements. Contact of a incompressible fluid under pressure with the net hydraulic surface, and the spring, create closing hydraulic and spring forces in a closing direction tending to push the non-rotating seal carrier from the retracted position towards the extended position, and contact of a compressible fluid under pressure with the net pneumatic surface creates an opening force in an opening direction tending to urge the non-rotating seal carrier from the extended position towards the retracted position.

BRIEF DESCRIPTION OF THE SEVERAL VIEWS OF THE DRAWING(S)

DETAILED DESCRIPTION OF THE INVENTION

The present disclosure is directed to a rotary seal for a coolant passage extending through an air spindle. The air spindle in accordance with the disclosure is advantageously configured to permit the passage of a fluid coolant through the spindle during a machining process such that a more reliable and accurate placement of the coolant flow can be achieved. Given the relatively high rotating speed of the shaft of the spindle, the rotary seal is configured to create a seal when liquid coolant is provided through the shaft, and to pop-off or create a gap between seal rings of the rotary seal when the flow of coolant is discontinued so that damage to the seal due to a dry-running condition and/or a heating of the seal rings can be avoided. As is known, rotary seals that create a mechanical face seal, often called "rotary unions," are prone to heating and, possibly, damage, when operating at high speeds in the absence of cooling and/or lubricating media. In the structures described herein, the pneumatic and hydraulic surfaces of the rotary union operate to urge the seal rings into contact with one another when a hydraulic pressure due to a coolant flow or, more generally, a flow of an incompressible fluid through the union is present within the union. The contacting seals create a mechanical face seal that permits the sealed flow of coolant from non-rotating machine portions into the rotating shaft of the spindle. When coolant flow is discontinued while the shaft is still rotating, for example, between operations and/or while rotation of the shaft is slowing, a pneumatic pressure applied externally to the rotary union within the spindle creates a force tending to push the sealing rings away from each other, which creates an air gap between the rings that effectively avoids a dry-running condition of the seal rings.

In one embodiment, a sealing arrangement in accordance with the disclosure is configured to maintain the two seal rings in contact with each other when pressurized coolant is present in the coolant channel. The pressurized coolant present in the coolant channel imparts a net hydraulic force onto a slidable, non-rotating seal carrier and sealing element or ring to force the non-rotating seal carrier in a closing direction (i.e., towards the rotating seal ring). This net hydraulic force is larger than a net pneumatic force imparted by the pressurized air acting externally on the seal carrier in the opposite (opening) direction.

When the coolant flow is discontinued, the hydraulic force disappears and the seal rings separate to create an air gap to form between the two seal rings such that excessive heating due to friction between the seal rings is avoided due to dry-running. The seal carrier is urged to move by the pneumatic force, which is no longer overcome by the hydraulic force. When the seal rings separate, air enters the coolant channel and purges any coolant that may remain therein.

Figure 1:
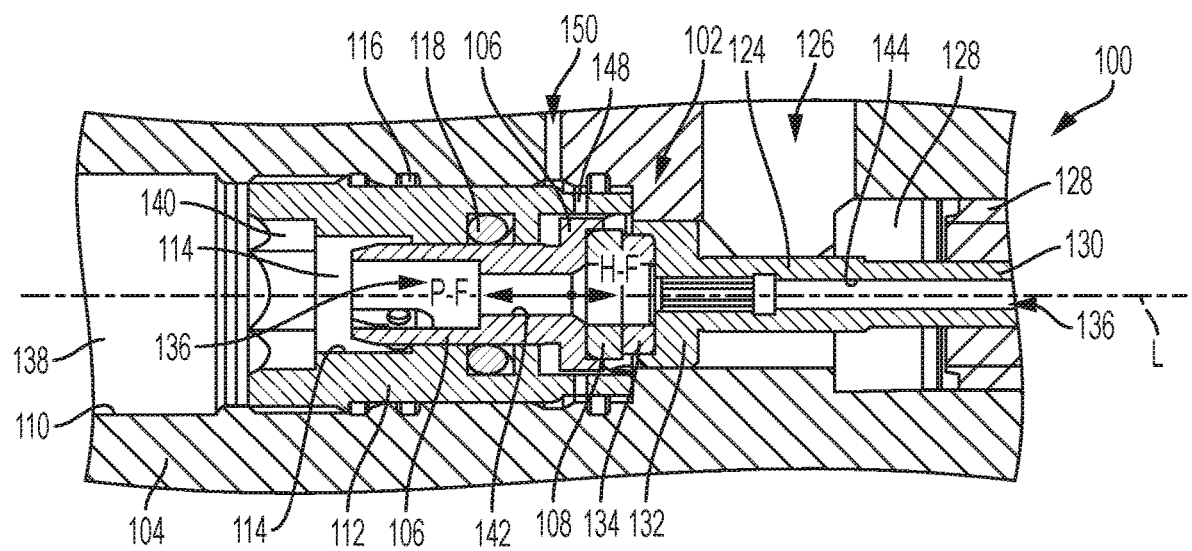
FIG. 1 is a cross section view through an air spindle showing a rotary seal in a closed position, in accordance with the disclosure.
Figure 2:
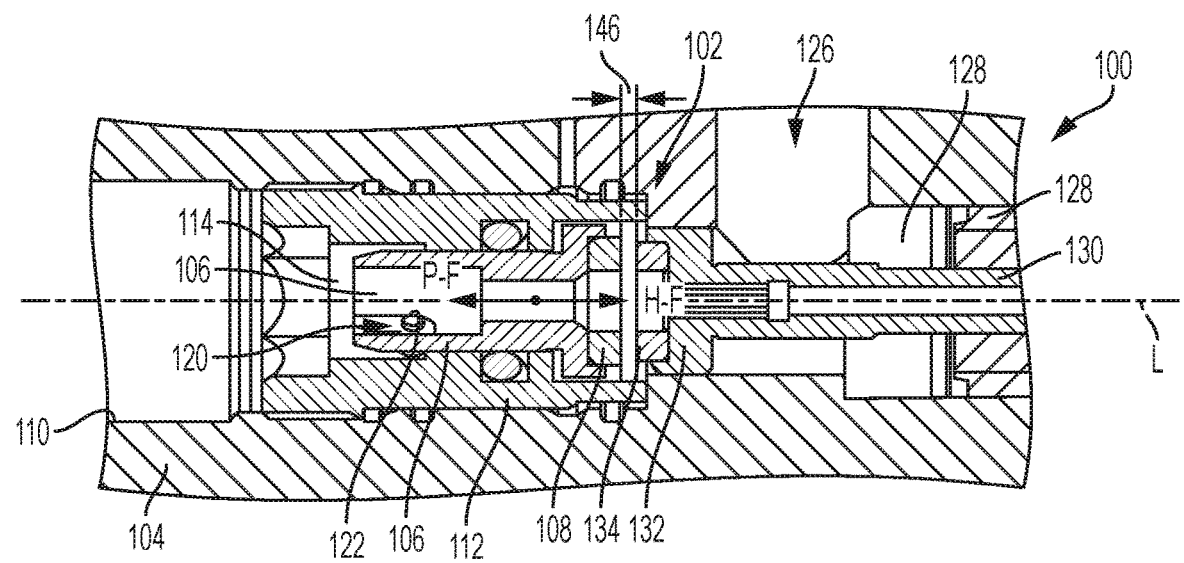
FIG. 2 is a cross section view through the air spindle of FIG. 1 showing the rotary seal in an open position.

A cross section through a portion of an air spindle 100 in accordance with the disclosure is shown in FIGS. 1 and 2 in two operating positions. In the illustration of FIG. 1, a rotary union 102 is shown in the closed or sealed position, and in the illustration of FIG. 2, the rotary union 102 is shown in the popped-off or open position. The air spindle 100 may be an air spindle operating in computer numeral control (CNC) machine that provides a source of pressurized air to power the shaft and also a source of liquid coolant, to be used to cool and clean the area in which a tool (not shown) that is connected to the shaft is cutting material away from a work piece (not shown) during operation.

The air spindle 100 includes rotating and non-rotating portions or components of the machine. Specifically, a non-rotating machine component 104 slidably and sealably accommodates a non-rotating seal carrier 106. The non-rotating seal carrier 106 includes a non-rotating seal ring 108 attached or otherwise formed thereon, which together with the non-rotating seal carrier 106 is slidably disposed within a bore 110 of the non-rotating machine component 104. In the embodiment shown, a mounting sleeve 112 that forms a sliding bore 114 is directly mounted into the bore 110, and forms the sliding bore 114 into which the non-rotating seal carrier 106 is slidably and sealably disposed.

Sealing between the mounting sleeve 112 and the bore 110, and also sealing between the sliding bore 114 and the non-rotating seal carrier 106 is accomplished by radial seals 116 and 118, respectively. As shown, the seals 116 are disposed between components that are stationary relative to one another, while the seals 118 accommodate a sliding motion between the non-rotating seal carrier 106 and the sliding bore 114. The seals 118 and 116 are embodied as O-rings, but other seal types may be used. Examples of other seal types include lip seals, u-cup seals, and the like.

To prevent rotation of the non-rotating seal carrier 106 relative to the non-rotating machine component 104, the non-rotating seal carrier 106 forms a slot 120 extending at least partially parallel to a longitudinal axis "L" of the spindle 100. A pin 122 is connected to a wall of the sliding bore 114 and extends radially inwardly. The pin 122 fits within with the slot 120 and is sized so that the slot 120 can slide along the pin 122 axially but not in a peripheral direction, thus preventing relative rotation of the non-rotating seal carrier 106 without inhibiting its axial motion in a direction along the longitudinal axis L during operation.

The air spindle 100 further includes rotating components. In the partial cross section shown in the figures, portions of an air turbine shaft are shown. Specifically, a shaft 124 is rotatably supported by bearings (not shown) and arranged to rotate when compressed air is provided through an air inlet 126 and an air passage 128 formed in the non-rotating machine component 104. Air provided at the air inlet 126 will travel through the air passage 128 and pass over axial turbine vanes 128 connected to the shaft 124, causing the vanes and shaft to turn.

The shaft 124 includes an elongate body 130 and an enlarged diameter receptacle 132 onto which a rotating seal ring 134 is co-rotatably mounted. A segmented coolant channel 136 is formed by a plurality of aligned bores and openings formed in various components of the machine. The coolant channel 136 extends from a coolant opening 138 formed in the non-rotating machine component 104, which is also an opening of the bore 110, through an open end 140 of the sliding bore 114, through an internal bore 142 of the non-rotating seal carrier 106, which has a generally tubular construction, through central openings of the rotating and non-rotating seal rings 134 and 108, and through a bore or barrel 144 extending through the elongate body 130 of the shaft 124.

Figure 4:
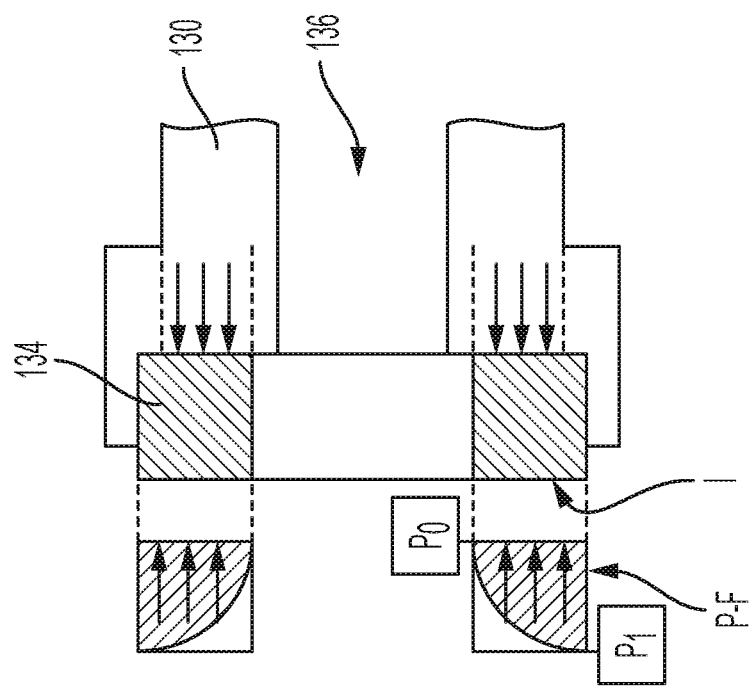
FIGS. 3 and 4 are diagrammatic views of forces acting on a seal ring at different operating conditions of a rotary spindle in accordance with the disclosure.

When the air spindle is operating, air under pressure provided through the air inlet 126 is present externally with respect to the non-rotating seal carrier. The various external surfaces of the non-rotating seal carrier 106 that are exposed to the air under pressure collectively provide a net pneumatic surface onto which a pneumatic force, P-F, acts, which for a particular structure is proportional to a pressure of the air that is provided at the inlet 126. A diagrammatic view that approximates the shape or distribution of the pneumatic force P-F across an annular seal ring interface, I, is shown in FIG. 4. As can be seen in FIG. 4, for an air pressure $P_1$ that is applied externally to the union, and an internal pressure $P_O$, the pneumatic force P-F has a parabolic distribution, which is represented by the shaded area under the curve in the chart. In the absence of other, dynamic forces acting on the non-rotating seal carrier (i.e., excluding frictional forces), the total pneumatic force P-F being externally applied, which is represented by the area under the curve shown applied onto the interface I, will tend to push the non-rotating seal carrier 106 in a direction towards the non-rotating machine component 104, that is, towards the left in the orientation shown in FIGS. 1 and 2, as denoted by the arrow in FIG. 2. As a result, the non-rotating seal carrier 106, along with the non-rotating seal ring 108, will move deeper or retract into the sliding bore 114 causing a separation or a gap 146 to form between the seal rings 108 and 134, as shown in FIG. 2. Retraction of the non-rotating seal carrier 106 may stop when the pin 122 abuts an end of the slot 120 or, more typically, when the air pressure pushes the non-rotating seal carrier 106 and the non-rotating seal ring 108 away from the rotating seal ring 134.

Figure 3:
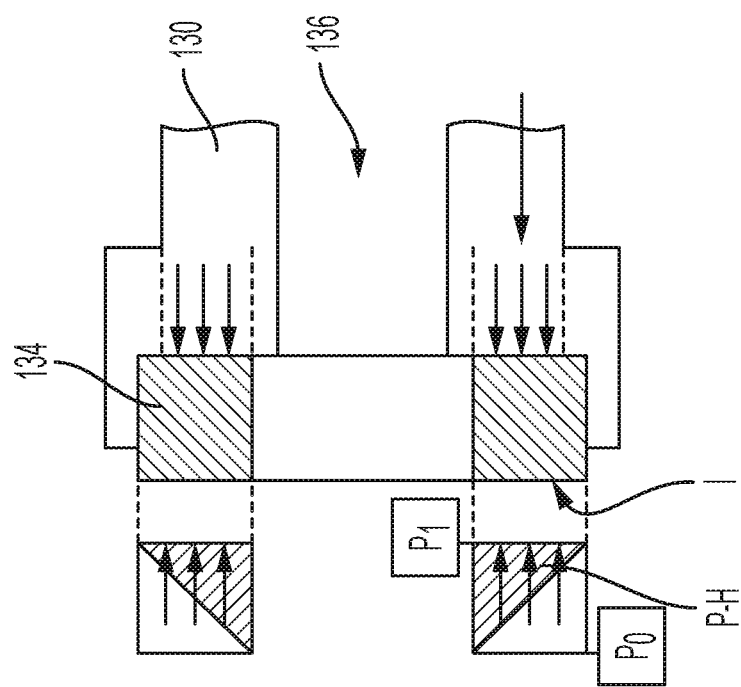

At times when coolant under pressure is provided at the coolant opening 138, the various internal surfaces of the non-rotating seal carrier 106 that are exposed to the coolant under pressure collectively provide a net hydraulic surface onto which a hydraulic force, H-F, which for a particular structure is proportional to a pressure of the coolant that is provided at the inlet 138. A diagrammatic view that approximates the shape or distribution of the hydraulic force P-H across the annular seal ring interface I is shown in FIG. 3. As can be seen in FIG. 3, for a fluid pressure $P_1$ that is applied internally to the union, and an external pressure $P_O$ (in this case, the air pressure), the hydraulic force P-H has a generally linear distribution, which is represented by the shaded area under the line of the chart. It is noted that, while the chart shows a linear distribution, the aggregate force might be best represented by a curve when the magnitudes of the pneumatic and hydraulic distributions are closer to one another. In the illustrated embodiment, for example, the pressure of the fluid internally to the union may be several orders of magnitude larger than an air pressure applied externally to the union, which results in a predominantly linear force distribution across the interface I in the chart of FIG. 3. A higher air pressure applied externally to the union, however, will tend to shape the aggregate curve more towards a parabolic shape.

The non-rotating seal carrier 106, along with the non-rotating seal ring 108 and the rotating seal ring 134, are configured such that the hydraulic force H-F is greater than the pneumatic force P-H for the operational air and coolant pressures selected for the machine. In this way, a net force that is equal to the difference between the hydraulic and pneumatic forces (H-F−P-F), and excluding any static forces, for example, friction, will tend to push the non-rotating seal carrier 106 in a direction towards the shaft 124, that is, towards the right in the orientation shown in FIGS. 1 and 2, as denoted by the arrow in FIG. 2. As a result, the non-rotating seal carrier 106, along with the non-rotating seal ring 108, will move outward or extend from the sliding bore 114 causing the gap 146 to close and the seal rings 108 and 134 to sealably engage one another, as shown in FIG. 1.

Extension of the non-rotating seal carrier 106 may stop when the seal rings 108 and 134 touch in a way that pushes or biases the non-rotating seal ring 108 into the rotating seal ring 134. Such biasing creates a mechanical face seal at an interface between the rings 108 and 134, which maintains a seal around the coolant conduit 136 that permits the transmission of coolant under pressure from the non-rotating machine component 104 into and through the bore 144 of the shaft 124 during operation. When the coolant supply ceases, the hydraulic pressure and corresponding force H-F also cease.

In the continued presence of air pressure, and with the hydraulic force H-F reduced to almost zero, the pneumatic force P-F changes the direction of the net force acting on the non-rotating seal carrier 106 and urges the seal rings to separate, as discussed above. Entry of air in this condition into the coolant channel 136 also helps purge any remaining coolant from the channel 136. Coolant spilling from the gap 146 may be collected and routed through a drain opening 148 formed in the mounting sleeve 112, and also through a corresponding drain opening 150 formed in the non-rotating machine component 104. The opening and closing of the gap 146 can therefore be selectively controlled by the provision of coolant under pressure internally to the rotary union 102 while air pressure that is external to the union 102 is present and rotating the shaft 124. In this way, lubrication and cooling by coolant of the seal interface created by the seal rings can be attained while the seal rings are connected, and separation of the seals can protect the seal rings under dry-running conditions.

It should be appreciated that the structures described herein are useful in applications other than air turbine spindles, which are described herein as an exemplary embodiment. In general, a rotary union in accordance with the disclosure can operate in any application where an internal pressurization of the rotary union by an incompressible fluid can be applied in the presence of external pressurization of the rotary union by a compressible fluid. Under such conditions, an internal pressurization with an incompressible fluid will provide a net hydraulic force tending to close the seal between seal rings of the union against a pneumatic force tending to push the seal rings apart. When application of the incompressible fluid is discontinued, the hydraulic force will decrease and will allow the pneumatic force applied by the compressible fluid externally on the union to push the seal rings apart. Thus, the operating position of the seal rings of the union will depend on a pressure difference between an internal force provided by pressure of an incompressible fluid and an external force provided by pressure of a compressible fluid. This pressure difference will, at times, have a net opening or a net closing effect on the union's seal rings. It is contemplated that a balance ratio for a rotary union in accordance with the disclosure, which can be defined as a ratio of net closing over net opening hydraulic or pneumatic areas of the union, can be larger than 50%, including larger than 100%.

Figure 5:
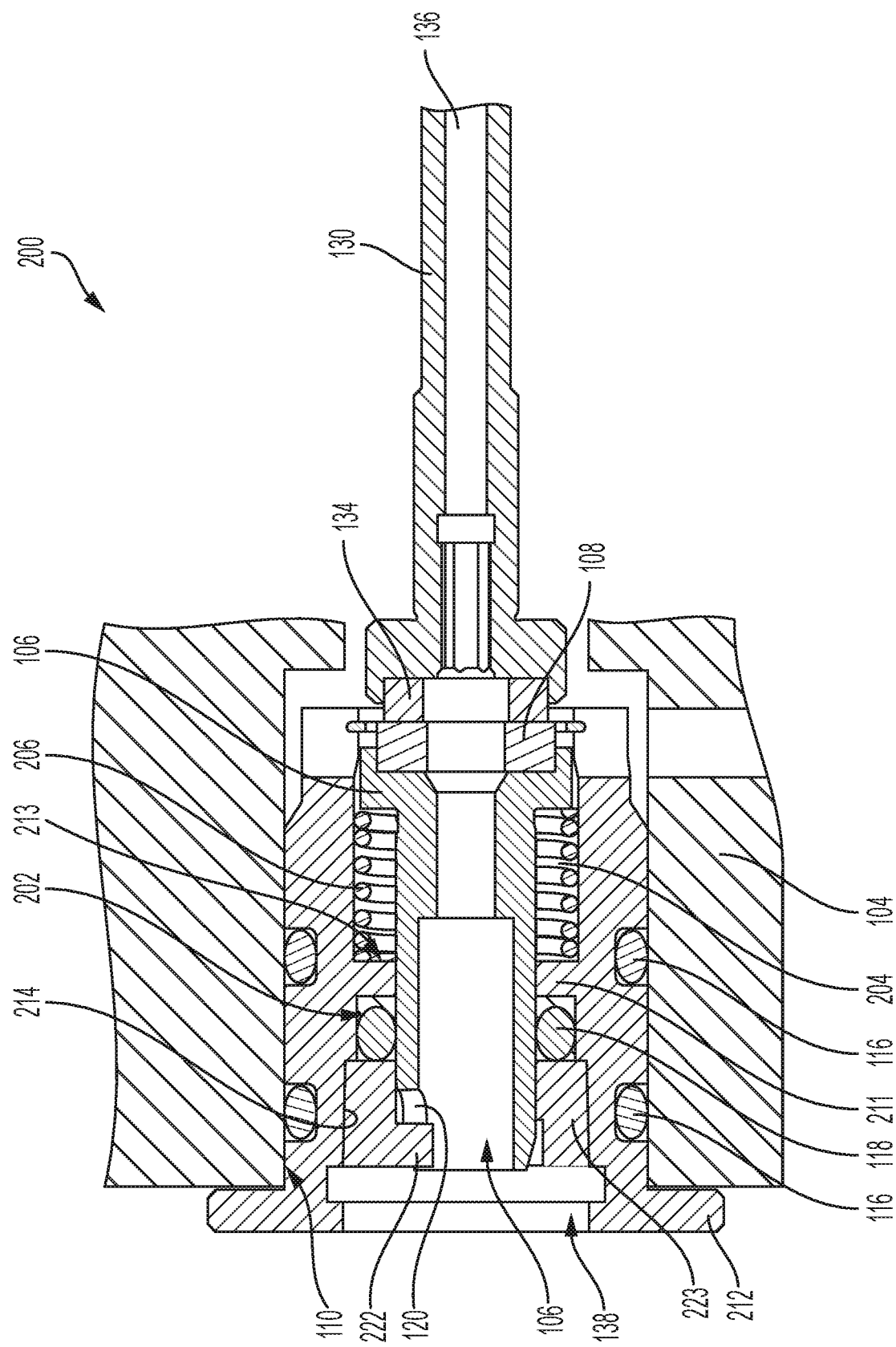
FIG. 5 is a cross section view through an air spindle having a closing spring in accordance with an alternative embodiment of the disclosure.

An alternative embodiment for an air spindle 200 is shown in cross section in FIG. 5. In this embodiment, structures and features that are the same or similar to corresponding structures and features of the air spindle 100 shown in FIGS. 1 and 2 are denoted by the same reference numerals previously used for simplicity. Accordingly, the air spindle 200 includes rotating and non-rotating portions or components of the machine. More particularly, a non-rotating machine component 104 slidably and sealably accommodates a non-rotating seal carrier 106. The non-rotating seal carrier 106 includes a non-rotating seal ring 108 attached or otherwise formed thereon, which together with the non-rotating seal carrier 106 is slidably disposed within a bore 110 of the non-rotating machine component 104. A mounting sleeve 212 forms a sliding bore 214 and is directly mounted into the bore 110. The sliding bore 214 differs from the sliding bore 114 (FIG. 1) in that carrier flange 211, which extends at least partially inwardly relative to the sliding bore 214 in a radial direction separates the bore into a first cylindrical cavity 202 and a second cylindrical cavity 204. The non-rotating seal carrier 106 is slidably and sealably disposed within the sliding bore 214.

To prevent rotation of the non-rotating seal carrier 106 relative to the non-rotating machine component 104, the non-rotating seal carrier 106 forms a slot 120 extending at least partially parallel to a longitudinal axis "L" of the spindle 200. In this embodiment, a radial protrusion 222 formed in a locking nut 223 extends into the slot 120 and fits within with the slot 120. The protraction 222 and is sized so that the slot 120 can slide there-along but not in a peripheral direction, thus preventing relative rotation of the non-rotating seal carrier 106 without inhibiting its axial motion in a direction along the longitudinal axis L during operation.

The air spindle 200 further includes a closing spring 206. As shown, the spring 206 is an axial compression spring, but other devices may be used such as a compression made from more than one element, a body made from a resilient material such as rubber, and the like. The spring 206 acts to impart a biasing force on the non-rotating seal carrier 106 tending to push the non-rotating seal 108 in a closing direction, i.e., towards the rotating seal 134. The magnitude of the closing spring force may be constant or may be proportional or otherwise related to an axial position of the non-rotating seal carrier 106 within the sliding bore 214. The closing spring 206 is axially constrained or disposed between an annular face 213 of the flange 211 that faces the non-rotating seal ring 108, and a radially outwardly extending face of the non-rotating seal carrier 106 that is, for example, adjacent an outer periphery of the non-rotating seal 108.

When the air spindle is operating, as described above, air under pressure provided provide a net pneumatic surface onto which a pneumatic force, P-F, acts, which for a particular structure is proportional to a pressure of the air that is provided. A spring force, along with hydraulic forces provided by internal pressure, counter the pneumatic force to augment the total force tending to push the non-rotating seal carrier 106 in a direction towards the non-rotating machine component 104. This permits maintaining a seal between the seal rings 108 and 134 for lower hydraulic pressures present in the union 200, as compared to the air spindle or union 100, and even for conditions when no hydraulic pressure is present (depending, of course, on the constant selected for the spring 206 and the value of the air pressure applied). It is contemplated, therefore, that a balance ratio for the rotary union 200 can be selected to be less than 50%.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A rotary union disposed along an incompressible fluid path between a rotating machine component and a non-rotating machine component, comprising:
   a mounting sleeve disposed in a bore formed in the non-rotating machine component, the mounting sleeve forming a sliding bore;
   a non-rotating seal carrier slidably and sealably disposed in the sliding bore, the non-rotating seal carrier including a non-rotating seal element, wherein the non-rotating seal element and the non-rotating seal carrier define a net hydraulic surface on an internal side and a net pneumatic surface on an external side;
   a rotating seal element disposed on the rotating machine component;
   wherein the non-rotating seal carrier is movable in an axial direction between an extended position, in which the rotating and non-rotating seal elements are in contact to form a mechanical face seal, and a retracted position, in which a gap is formed in the axial direction by separation of the rotating and non-rotating seal elements; and
   wherein, during operation, contact of an incompressible fluid under pressure with the net hydraulic surface creates a closing force in a closing direction tending to push the non-rotating seal carrier from the retracted position towards the extended position; and
   wherein, during operation, a compressible fluid is adapted to be provided and present externally with respect to the non-rotating seal carrier and surrounding the mechanical face seal, so that contact of the compressible fluid under pressure with the net pneumatic surface creates an opening force in an opening direction tending to push the non-rotating seal carrier from the extended position towards the retracted position.

2. The rotary union of claim 1, further comprising a spring disposed between the mounting sleeve and the non-rotating seal carrier, the spring disposed to provide a spring force in the closing direction.

3. The rotary union of claim 2, wherein the mechanical face seal is formed when a total closing force present in the closing direction is larger than a total opening force present in the opening direction.

4. The rotary union of claim 3, wherein the total closing force includes the spring force and the closing force resulting from the incompressible fluid acting on the net hydraulic surface.

5. The rotary union of claim 3, wherein the total closing force is primarily provided by the spring closing force, which is larger than the opening force resulting from the compressible fluid acting on the net pneumatic surface.

6. The rotary union of claim 1, wherein the mechanical face seal is formed when a total closing force present in the closing direction is larger than a total opening force present in the opening direction.

7. The rotary union of claim 6, wherein the total closing force is provided primarily by the incompressible fluid acting on the net hydraulic surface.

8. The rotary union of claim 6, wherein the total opening force is provided primarily by the compressible fluid acting on the net pneumatic surface.

9. The rotary union of claim 1, wherein the compressible fluid is air and wherein the incompressible fluid is coolant.

10. A method for operating a rotary union, comprising:
providing a non-rotating seal carrier slidably and sealably disposed within a sliding bore, the non-rotating seal carrier including a non-rotating seal element;
defining net hydraulic surface on an internal side of the non-rotating seal element and the non-rotating seal carrier;
defining a net pneumatic surface on an external side of the non-rotating seal element and the non-rotating seal carrier;
providing a rotating seal element disposed on the rotating machine component; and
moving the non-rotating seal carrier in an axial direction between an extended position, in which the rotating and non-rotating seal elements are in contact to form a mechanical face seal, and a retracted position, in which a gap is formed in the axial direction by separation of the rotating and non-rotating seal elements;
wherein moving from the retracted to the extended positions is accomplished by providing a incompressible fluid in contact with the net hydraulic surface to create a closing force in a closing direction; and
wherein moving from the extended to the retracted positions is accomplished by providing a compressible fluid externally with respect to and surrounding the mechanical face seal in contact with the net pneumatic surface to create an opening force in an opening direction.

11. The method of claim 10, further comprising providing a spring disposed to provide a spring force in the closing direction.

12. The method of claim 11, wherein the mechanical face seal is formed when a total closing force present in the closing direction is larger than a total opening force present in the opening direction.

13. The method of claim 12, wherein the total closing force includes the spring force added with the closing force, which results from the incompressible fluid acting on the net hydraulic surface.

14. The method of claim 12, wherein the total closing force is primarily provided by the spring closing force, which is larger than the opening force resulting from the compressible fluid acting on the net pneumatic surface.

15. The method of claim 10, wherein the mechanical face seal is formed when a total closing force present in the closing direction is larger than a total opening force present in the opening direction.

16. The method of claim 15, wherein the total closing force is provided primarily by the incompressible fluid acting on the net hydraulic surface.

17. The method of claim 15, wherein the total opening force is provided primarily by the compressible fluid acting on the net pneumatic surface.

18. The method of claim 10, wherein the compressible fluid is air and wherein the incompressible fluid is coolant.

19. A rotary union disposed along an incompressible fluid path between a rotating machine component and a non-rotating machine component, comprising:
a mounting sleeve disposed in a bore formed in the non-rotating machine component, the mounting sleeve forming a sliding bore;
a non-rotating seal carrier slidably and sealably disposed in the sliding bore, the non-rotating seal carrier including a non-rotating seal element, wherein the non-rotating seal element and the non-rotating seal carrier define a net hydraulic surface on an internal side and a net pneumatic surface on an external side;
a rotating seal element disposed on the rotating machine component; and
a spring disposed between the mounting sleeve and the non-rotating seal carrier, the spring providing a spring force onto the non-rotating seal carrier;
wherein the non-rotating seal carrier is movable in an axial direction between an extended position, in which the rotating and non-rotating seal elements are in contact to form a mechanical face seal, and a retracted position, in which a gap is formed in the axial direction by separation of the rotating and non-rotating seal elements; and
wherein, during operation, contact of an incompressible fluid under pressure with the net hydraulic surface, and the spring, create closing hydraulic and spring forces in a closing direction tending to push the non-rotating seal carrier from the retracted position towards the extended position; and
wherein, during operation, a compressible fluid is adapted to be provided and present externally with respect to the non-rotating seal carrier and surrounding the mechanical face seal, so that contact of the compressible fluid under pressure with the net pneumatic surface creates an opening force in an opening direction tending to urge the non-rotating seal carrier from the extended position towards the retracted position.

20. The rotary union of claim 19, wherein the mechanical face seal is formed when a total closing force present in the closing direction is larger than a total opening force present in the opening direction.

* * * * *